United States Patent [19]

Hous et al.

[11] Patent Number: 5,102,958

[45] Date of Patent: Apr. 7, 1992

[54] PARTIALLY CROSSLINKED ELASTOMERIC POLYMERS AND PROCESS FOR PRODUCING THE SAME

[75] Inventors: Pierre Hous, Steenokkerzeel, Belgium; Olivier H. Lacoste, Rueil Malmaison, France; James V. Fusco, Red Bank, N.J.; Irwin J. Gardner, Scotch Plains, N.J.; William M. Davis, Westfield, N.J.; Lawrence W. Flatley, Somerville, N.J.

[73] Assignee: Exxon Chemical Patents Inc., Linden, N.J.

[21] Appl. No.: 707,739

[22] Filed: May 30, 1991

Related U.S. Application Data

[62] Division of Ser. No. 455,130, Dec. 22, 1989.

[51] Int. Cl.$^5$ .................................................. C08F 8/34
[52] U.S. Cl. ............................ 575/332.8; 525/333.1; 525/343; 525/350; 525/353; 525/380; 525/381; 525/382; 525/384
[58] Field of Search .................. 525/332.8, 333.1, 343, 525/350, 353, 380, 381, 382, 384

[56] References Cited

U.S. PATENT DOCUMENTS

| | | | |
|---|---|---|---|
| 2,631,984 | 3/1953 | Crawford et al. | 260/5 |
| 2,729,626 | 1/1956 | Welch et al. | 260/80.7 |
| 2,732,354 | 1/1956 | Morrissey et al. | 260/5 |
| 2,781,334 | 2/1957 | Welch et al. | 260/80.7 |
| 2,943,664 | 7/1960 | Baldwin et al. | 152/359 |
| 2,944,578 | 7/1960 | Baldwin et al. | 152/330 |
| 2,964,489 | 12/1960 | Baldwin et al. | 260/41.5 |
| 3,099,644 | 7/1963 | Parker et al. | 260/85.3 |
| 3,758,643 | 9/1973 | Fischer | 260/897 |
| 3,862,106 | 1/1975 | Fischer | 260/80.78 |
| 4,130,534 | 12/1978 | Coran et al. | 260/33.6 |
| 4,513,116 | 4/1985 | Kowalski et al. | 525/53 |
| 4,548,995 | 10/1985 | Kowalski et al. | 525/354 |
| 4,554,326 | 11/1985 | Kowalski et al. | 525/354 |
| 4,563,506 | 1/1986 | Kowalski et al. | 525/354 |
| 4,594,390 | 6/1986 | Sabet et al. | 525/232 |

OTHER PUBLICATIONS

Brochure of Polysar Corporation Paper presented at ACS Meeting of May 9-12, 1989, Fusco et al., "Chlorobutyl Designed for Curing Members".

*Primary Examiner*—Bernard Lipman
*Attorney, Agent, or Firm*—M. L. Gibbons

[57] ABSTRACT

A partially crosslinked, unsaturated elastomeric polymer of a $C_4$ to $C_7$ isomonoolefin and a $C_4$ to $C_{14}$ conjugated multiolefin is provided which has a low crosslink density. The partially crosslinked polymer is produced by curing an uncrosslinked unsaturated polymer having a low level of chemically bound halogen with a curing agent which reacts only with the halogen. Processes for preparing these partially crosslinked unsaturated polymers are also provided.

36 Claims, No Drawings

PARTIALLY CROSSLINKED ELASTOMERIC POLYMERS AND PROCESS FOR PRODUCING THE SAME

CROSS REFERENCE TO RELATED APPLICATIONS

This application is a Rule 60 Divisional application of U.S. patent application Ser. No. 455,130, filed Dec. 22, 1989.

BACKGROUND OF THE INVENTION

1. Field of the Invention

The present invention relates to crosslinked elastomeric polymers having a relatively low density of crosslinks, that is, a partially crosslinked unsaturated elastomeric polymer.

2. Description of Information Disclosures

Crosslinked elastomers are known in which the molecular chains are crosslinked at the sites of the carbon to carbon double bond, of the uncrosslinked initial polymer, as well as at the site of other functional groups present in the uncrosslinked polymer, such as, for example at the site of chemically-bound halogen.

Partially crosslinked polymers are known such as those disclosed in U.S. Pat Nos. 2,781,334 and 2,729,626 in which the polymers are prepared by copolymerizing an isoolefin with a conjugated diolefin and a divinyl benzene. Such polymers require the use of divinyl benzene in its preparation as well as the use of the isoolefin and the conjugated diolefin. A brochure of Polysar Corporation discloses Polysar ® Butyl Terpolymers such as XL 10,000 (previously XL-20), including Polysar ® Butyl Terpolymer XL 40302 which is described as a halogenated type (printed in Canada, 1988).

Halogenated butyl rubber having a low level of halogen e.g., chlorine content of about 0.5 mole percent (about 0.3 wt. %) and a low level of non-halogenated isoprene unsaturation are disclosed in a paper entitled "Chlorobutyl Designed for Curing Members" authored by J. V. Fusco, I. J. Gardner, P. Hous and D. S. Tracey presented at a meeting of the Rubber Division, American Chemical Society, Mexico City, Mexico, May 9-12, 1989.

Numerous patents disclose halogenated butyl rubber containing various amounts of chemically bound halogen, for example, U.S. Pat. No. 2,631,984 discloses brominated butyl rubber containing at least 0.5 weight percent bromine; U.S. Pat. No. 2,732,354 discloses chlorinated butyl rubber containing from 0.4 to 2.3 weight percent chlorine; U.S. Pat. No. 3,099,644 discloses a process for the continuous halogenation of butyl rubber to produce a halogenated rubber containing 1.13 weight percent chlorine. U.S. Pat. No. 2,732,354 discloses chlorinated butyl rubber containing from about 0.4 to 2.3 weight percent of chlorine. U.S. Pat. No. 2,944,578 describes compositions comprising chlorinated butyl rubber in which the butyl rubber has been substitutively chlorinated to contain at least 0.5 weight percent chlorine; FIG. 2 of this patent appears to include a data point at about 0.6 wt. % chlorine. U.S. Pat. No. 3,099,644 discloses a process for the continuous halogenation of butyl rubber to produce a halogenated rubber containing 1.13 weight percent chlorine. U.S. Pat. No. 2,943,664 discloses adhesive compositions for tire cords comprising chlorinated butyl rubber containing at least 0.5 percent by weight of combined chlorine. U.S. Pat. No. 2,964,489 discloses a process for the production of tubeless tires and curing bladders containing 0.5 weight percent chlorine. The chlorine content of known chlorinated butyl rubber is typically defined by a formula, as shown, for example, in U.S. Pat. No. 2,964,489 (column 2, lines 50-60) and expressed as being "at least 0.5 wt. percent (preferably at least about 1.0 wt. percent) combined chlorine." In a restatement of the chlorine concentration, it is stated that there should be "at least 0.2 and preferably at least about 0.5 weight percent of combined chlorine in the polymer." (id, lines 60-62).

U.S. Pat. No. 4,130,534 discloses elastoplastic compositions comprising a blend of thermoplastic crystalline polyolefin resin and a butyl rubber, crosslinked to the extent that it is at least 90 percent gelled. It defines butyl rubber (at column 5, lines 17-34) to include "copolymers of isobutylene and isoprene containing 0.5 to 10, more preferably 1 to 4 percent by weight isoprene and said copolymers halogenated with from 0.1 to about 10, preferably 0.5 to 3.0 weight percent chlorine or bromine which chlorinated copolymer is commonly called chlorinated butyl rubber".

U.S. Pat. No. 3,758,643 and U.S. Pat. No. 3,862,106 (W. K. Fischer) disclose a partially crosslinked EPDM polymer having a gel content of at least 30 percent but less than 90 percent by weight as measured by immersion in cyclohexane for 48 hours at 73° F.

It is known to perform melt phase reaction of polymers in continuous flow devices, such as extruder-reactors. See, for example, U.S. Pat. Nos. 4,513,116; 4,548,995; 4,554,326, and 4,563,506, the teachings of which are hereby incorporated by reference.

U.S. Pat. No. 4,594,390 discloses the use of an extruder to prepare thermoplastic compositions comprising a blend of plastic and cured rubber.

There is field of use for butyl rubber wherein the rubber itself is required to be uncured, but where the inherent properties of uncured rubber (cold flow, low green strength) represent a drawback. Such uses include those where butyl and halobutyl are the polymeric material in easily processed formulations suitable for mastics, pipe wrap, sealants, cable fillers etc. Formulations based on such uncured rubbers tend to flow in service, and therefore, it would be useful to employ in such formulations butyl or halobutyl rubber which has been partially cured.

The disadvantages associated with known partially cured butyl rubber derive from the manner in which such polymers are produced and the means for crosslinking which are employed. For example, known partially crosslinked butyl is produced by adding to the butyl compound, under curing conditions, a curative such as a sulphur or phenol resin system in an amount which is less than the amount required to give crosslinking at all of the available crosslinking sites. The result is a vulcanized rubber which is crosslinked through some of the unsaturation sites in the copolymer backbone. However, because such unsaturation sites are relatively numerous, and because the process is limited by dispersion of the curatives in the polymer, it is extremely difficult to control the crosslinking. The result is a product with a reduced unsaturation and with inconsistent product quality deriving from the failure to control the extent and location of crosslinking within and between the polymer chain. Similar problems arise when the starting polymer, prior to crosslinking, is known halobutyl rubber, since in this case the halogen atoms carried on the isoprene units also contribute to the crosslinking mechanism, making control even more difficult.

An alternative way to obtain partially cured butyl rubber is to introduce a crosslinking agent such as divinyl benzene into the reactor in which the copolymerization is carried out. Again, though, the degree and distribution of crosslinking along the copolymer chains is difficult to control, and the product, therefore, suffers from variability in its properties.

It has now been found that elastomeric polymers can be produced which have a controlled relatively low degree of crosslinking, thereby constituting useful products which can be used where uncured rubbers have been used but without the disadvantages of uncured rubber. The partially crosslinked elastomeric polymers of the present invention can be further processed in conventional rubber processing equipment and are useable in such formulations as adhesives, sealants, etc. The partially crosslinked elastomeric polymers of the invention possess elastomeric as well as thermoplastic properties.

SUMMARY OF THE INVENTION

In accordance with the invention, there is provided a partially crosslinked, unsaturated copolymer of a $C_4$ to $C_7$ isomonoolefin and a $C_4$ to $C_{14}$ conjugated multiolefin, comprising substantially randomly distributed covalent crosslinks, an olefinic unsaturation ranging from about 0.05 to about 5.0 mole percent, a gel content ranging from about 10 weight percent to about 90 weight percent as measured in cyclohexane for 48 hours at a temperature of 23° C., said crosslinks having been formed after the polymerization and halogenation of the corresponding uncrosslinked copolymer of a $C_4$ to $C_7$ isomonoolefin and a $C_4$ to $C_{14}$ conjugated diene, said cross-linked unsaturated copolymer being substantially free of chemically bound halogen.

In accordance with the invention, there is also provided a process for preparing a partially crosslinked unsaturated copolymer of a $C_4$ to $C_7$ isomonoolefin and a $C_4$ to $C_{14}$ conjugated multiolefin, which comprises the step of contacting, at crosslinking conditions, an uncrosslinked, unsaturated halogen-containing copolymer of a $C_4$ t o $C_7$ isomonoolefin and a $C_4$ to $C_{14}$ conjugated multiolefin comprising an unsaturated, non-halogen-containing moiety and an unsaturated, chemically bound allylic halogen-containing moiety, said halogen being selected from the group consisting from about 0.05 to about 0.4 weight percent chlorine, from about 0.05 to 0.5 weight percent bromine and mixtures thereof, in the presence of a curing agent which reacts essentially only with said allylic halogen and in the absence of a curing agent which reacts with said unsaturated, non-halogen-containing moiety.

DETAILED DESCRIPTION OF THE INVENTION

The partially crosslinked, unsaturated copolymers of a $C_4$ to $C_7$ isomonoolefin and $C_4$ to $C_{14}$ conjugated multiolefin of the present invention have covalent crosslinks which are randomly distributed and an olefinic unsaturation ranging from about 0.05 to about 5.0 mole percent, preferably from about 0.50 to about 2.5 mole percent, more preferably from about 0.10 to about 2.0 mole percent. The gel content of the crosslinked unsaturated copolymers of the invention ranges from about 10 wt. % to about 90 wt. %, preferably from about 10 to about 89 wt. %, more preferably from about 40 to about 85 wt. % as measured by soaking a sample of the material in cyclohexane for about 48 hours at about 23° C. In any event, the gel content of the crosslinked copolymer, will be greater than the gel content of the uncrosslinked copolymer prior to the crosslinking reaction. The crosslinks are formed after the polymerization of the isomonoolefin with the conjugated multiolefin and after the halogenation thereof. The crosslink density of the total crosslinked polymer may range from about 0.05 to about $0.22 \times 10^{-4}$ moles per cubic centimeter, preferably from about 0.10 to about $0.18 \times 10^{-4}$ moles per cubic centimeter. The crosslink density of the polymer is determined by equilibrium solvent swelling using the Flory-Rehner equation, J. Rubber Chem. and Tech., 30, p. 929. The appropriate Huggins solubility parameter for butyl rubber/cyclohexane, 0.433 used in the calculation was obtained from the review article by Sheehan and Bisio, J. Rubber Chem and Tech., 39, 167.

The crosslinked copolymers of the present invention are substantially free of chemically bound halogen. By the term "substantially free of chemically bound halogen" is intended herein, a crosslinked copolymer comprising less than about 0.1 weight percent chemically bound halogen, preferably less than about 0.06 wt. % chemically bound halogen.

The average molecular weight between crosslinks (Mc) of the crosslinked unsaturated elastomeric polymers of the invention as calculated from the crosslink density and the equation $$2 M_c = \frac{\text{Rubber density}}{\text{Crosslink density}} = \frac{0.92 \ (g/cm^3)}{\text{crosslink density (moles/cm}^3)}$$

may range from about 100,000 to about 20,000 which is equivalent to from about 0.05 to about 0.22 moles of crosslinks per $cm^3$.

PROCESS FOR THE PREPARATION OF THE CROSSLINKED UNSATURATED ELASTOMERIC POLYMERS

The partially crosslinked, unsaturated copolymers of the present invention are prepared by contacting an uncrosslinked, unsaturated halogen-containing polymer of a $C_4$ to $C_7$ isomonoolefin and a $C_4$ to $C_{14}$ conjugated multiolefin comprising at least one unsaturated monomeric moiety which does not have a chemically bound halogen and at least one unsaturated moiety which has a chemically bound allylic halogen with a curing agent which reacts essentially only with the allylic halogen and in the absence of a curing agent which reacts with the unsaturated monomeric moiety which does not have a chemically bound halogen, such as for example, in the absence of a phenolic resin and in the absence of elemental sulfur, for a time sufficient to form covalent crosslinks at the allylic halogen sites.

Suitable curing conditions include a temperature ranging from about 100° to 260° C., preferably from about 170° to 210° C., for a time period ranging from above zero to about 15 minutes. The pressure is not critical.

The curing agents, which are useful in the practice of the invention, include metal oxides of Groups IIB, and IVA of the Periodic Table of Elements, such as zinc oxide; zinc salts of organic compounds such as zinc salts of dithiocarbamic acid, for example, zinc dibutyldithiocarbamate, zinc dimethyldithiocarbamate; amines; dimercaptans, diols, thiourea-thiurams, alkyl phenol disulfides, and other dithiocarbamates, and mixtures thereof. A preferred curing agent comprises zinc oxide. More preferably, the curing agent comprises zinc oxide and a zinc salt of dithiocarbamic acid.

The Periodic Table of Elements referred to herein is in accordance with the table published by Sargent-Welch, copyright 1968, Sargent-Welch Scientific Company.

The curing agent may be used in combination with accelerators or co-curing agents such as fatty acids, for example, stearic, palmitic, lauric acids; weak amines, salts of these two groups; polyalcohols; aminoalcohols e.g., triethanolamine; ethylene glycol; diamines; zinc carbonate, etc.

It is important to conduct the curing step of the present invention in the absence of a curing agent which could react effectively with the non-halogenated unsaturated moiety of the uncrosslinked initial copolymer to prevent crosslinking at the unsaturated sites (carbon-to-carbon double bond) of the non-halogenated unsaturated moiety.

Suitable amounts of curing agent to be used in the process of the present invention include a molar ratio of curing agent to bound halogen in the uncrosslinked (halogenated) initial polymer of at least 0.25:1, preferably at least about 1:1. The upper limit is not critical and may suitably be 10:1, preferably 7:1 more preferably 5:1.

If desired, the uncrosslinked (halogenated) polymer is contacted at conditions, (e.g., including a sufficient time period) for the curing agent to react with substantially all the chemically bound halogen of the initial uncrosslinked polymer and, thereby, produce a covalently crosslinked polymer substantially free of chemically bound halogen.

It should be noted that polymers comprising a low level of crosslinks have, heretofore, been obtained by using low proportion of curing agents so that crosslinks will not be formed at all available reactive sites (e.g., halogen and unsaturated sites) in the polymer chain. Since control of curative concentration, dispersion, etc., is difficult, the products obtained by such control of the concentration of the curing agent are not usually consistent in their level of crosslinks and are less preferred.

An advantage of the process of this invention is to attempt to crosslink as many of the halogen sites as feasible. Such a process is reproducible whereas attempting to crosslink only a portion of the halogen is difficult to reproduce. The curing agent of the present invention may be used in stoichiometric excess over the chemically bound halogen of the initial uncrosslinked polymer. Since use of the curing agent of the present invention results in crosslinks only at the halogen sites, it is the halogen concentration which controls the crosslink density of the crosslinked polymer product of the invention.

An advantage of using a curing agent in stoichiometric excess is that it is possible theoretically to remove substantially all the halogen moieties from the initial uncrosslinked polymer, either because the halogen sites are crosslinked, or because they have been substituted by a curative moiety or consumed in a side reaction.

The curing step may be conducted under static conditions, for example, in an autoclave, a curing press etc., or under dynamic conditions, e.g., in an extruder or internal mixer.

The contacting zone for the curing step of the present invention may be in an internal mixer and may be a batch-wise or continuous process, (e.g.), (Banbury ®, Brabender ® or extruder type). Preferably, the initial uncrosslinked polymer and the curing agent are contacted at curing conditions in a continuous flow device. Suitable devices include kneaders, extruders (employing single or multiple screws, e.g., twin screws), continuous mixers and a blending/extrusion device referred to as a cavity transfer mixer as described in U.S. Pat. No. 4,419,014, the teachings of which are hereby incorporated by reference.

The Initial Uncrosslinked Halogen-Containing Unsaturated Polymers

The initial uncrosslinked halogen-containing unsaturated polymers suitable for use in the curing step of the process of the present invention include halogen-containing copolymers of a $C_4$ to $C_7$ isomonoolefin and a $C_4$ to $C_{14}$ multiolefin (i.e., halobutyl polymers). The uncrosslinked halogen-containing copolymer comprises: (1) at least one, but generally more than one, unsaturated monomeric moiety which has a carbon to carbon double bond (olefinic unsaturation) and which does not have a chemically bound halogen atom, and (2) at least one, but generally more than one, unsaturated monomeric moiety which comprises a carbon to carbon double bond and a chemically bound allylic halogen, that is, a halogen atom attached to the allylic carbon atom. The copolymer additionaly comprises a $C_4$ to $C_7$ isomonoolefin moiety.

The chemically bound halogen may be chlorine, bromine and mixtures thereof. The chemically bound halogen may be present in the uncrosslinked initial copolymer in an amount ranging from about 0.05 to about 0.4, preferably from about 0.05 to about 0.39, more preferably from about 0.1 to about 0.35 weight percent chlorine or from about 0.05 to about 0.5, preferably from about 0.05 to about 0.49, more preferably from about 0.1 to about 0.45 weight percent bromine and mixtures thereof. When mixtures of halogen are employed, the bromine content limits apply except that the chlorine content should not exceed about 0.4 weight percent The total unsaturation of the initial uncrosslinked halogen-containing unsaturated polymers may suitably range from about 0.05 to 5, preferably from about 0.50 to 2.5, more preferably from about 0.10 to 2.0 mole percent.

The halogen-containing copolymer of an isomonoolefin and a multiolefin are obtained by the halogenation of a copolymer of a $C_4$ to $C_7$ isomonoolefin and a $C_4$ to $C_{14}$ multiolefin, hereinafter referred to as "butyl rubber".

The useful copolymers comprise a major portion of isomonoolefin and a minor amount, preferably not more than 30 wt. percent, of a conjugated multiolefin The preferred copolymers comprise about 85-99.5 wt. percent (preferably 95-99.5 wt. percent) of a $C_4$-$C_7$ isomonoolefin, such as isobutylene, and about 15-0.5 wt. percent (preferably about 5-0.5 wt. percent) of a multiolefin of about 4-14 carbon atoms. These copolymers are referred to in the patents and literature as "butyl rubber"; see, for example, the textbook *Synthetic Rubber* by G. S. Whitby (1954 edition by John Wiley and Sons, Inc.), pages 608-609, etc. The term "butyl rubber", as used herein, includes the aforementioned copolymers of an isomonoolefin having 4-7 carbon atoms and about 0.5 to 20 wt. percent of a conjugated multiolefin of about 4-14 carbon atoms. Preferably these copolymers contain about 0.5 to about 5 percent conjugated multiolefin. The preferred isomonoolefin is isobutylene. Suitable conjugated multiolefins include isoprene, butadiene, dimethyl butadiene, piperylene, etc. The preferred conjugated multiolefin is isoprene.

Commercial butyl rubber is a copolymer of isobutylene and minor amounts of isoprene. It is generally prepared in a slurry process using methyl chloride as a vehicle and a Friedel-Crafts catalyst as the polymerization initiator. The methyl chloride is liquid at −100° C. and offers the advantage that $AlCl_3$, a relatively inexpensive Friedel-Crafts catalyst is soluble in it, as are the isobutylene and isoprene comonomers. Additionally, the butyl rubber polymer is insoluble in the methyl chloride and precipitates out of solution as fine particles that thereby forms a slurry. The polymerization is generally carried out at temperatures of about −90° C. to −100° C. See U.S. Pat. Nos. 2,356,128 and 2,356,129 incorporated herein by reference.

The polymerization process, which is typically carried out in a draft tube reactor, is continuous. Monomer feed and catalyst are continuously introduced at the bottom of the draft tube where an axial flow pump is located. The pump circulates the slurry at high velocity to provide efficient mixing and heat transfer. Polymer slurry containing about 20-30 wt. percent butyl rubber continuously overflows from the reactor through a transfer line.

Where the desired product is the butyl rubber itself, the slurry is fed through the transfer line to a flash drum operated at about 140-180Pa (1.38-1.58 atm) and 65°-75° C. Steam and hot water are mixed with the slurry in a nozzle as it enters the drum to vaporize methyl chloride and unreacted monomers which pass overhead, are recovered, and the polymer is finished by water removal and drying. Where, however, it is desired to produce a halogenated butyl rubber, this can be accomplished by preparing a solution of the rubber. Generally, any halogenation technique may be utilized, including solution halogenation and melt phase halogenation.

In one preferred method of halogenation, a "solvent replacement" process is utilized. Cold butyl rubber slurry in methyl chloride from the polymerization reactor is passed to an agitated solution in a drum containing liquid hexane. Hot hexane vapors are introduced to flash overhead the methyl chloride diluent and unreacted monomers. Dissolution of the fine slurry particles occurs rapidly. The resulting solution is stripped to remove traces of methyl chloride and monomers, and brought to the desired concentration for halogenation by flash concentration. Hexane recovered from the flash concentration step is condensed and returned to the solution drum.

In the halogenation step of the process, butyl rubber in solution is contacted with chlorine or bromine in a series of high-intensity mixing stages. Hydrochloric or hydrobromic acid is generated during the halogenation step and must be neutralized. For a detailed description of the halogenation process see U.S. Pat. Nos. 3,029,191 and 2,940,960, as well as U.S. Pat. No. 3,099,644 which describes a continuous chlorination process, all of which patents are incorporated herein by reference.

The uncrosslinked halogen-containing initial copolymers suitable for use in the curing step of the present invention may be obtained by halogenating an uncrosslinked unsaturated butyl rubber having a concentration of unsaturation which falls within the desired previously stated ranges for the initial halogenated uncrosslinked polymer.

The low concentration of halogen in the halogenated butyl rubber can be achieved by alternative means. In one method of preparation, the butyl rubber containing a low concentration of double bonds, e.g., by means of enchained isoprene, is halogenated in a 1:1 molar ratio, thereby incorporating approximately one halogen atom for each double bond originally present in the butyl rubber. Alternatively, butyl rubber comprising a concentration of such double bonds greater than is required based on the preferred concentration of halogen, is only partially halogenated, thereby retaining unhalogenated double bond moieties. Where partially halogenated butyl rubber is used, the concentration of unhalogenated double bonds is generally from about 0.12 to about 1.88 mole percent; preferably from about 0.12 to about 0.75 mole percent.

DESCRIPTION OF THE PREFERRED PREPARATION PROCESS EMBODIMENT

A preferred embodiment for the process of preparation of crosslinked copolymers of the invention is to perform the crosslinking in a extruder-reactor. A more preferred embodiment of the process is as follows:

An uncrosslinked unsaturated halogenated elastomeric polymer comprising from about 0.05 to about 0.4 wt. % chemically bound chlorine or from about 0.05 to about 0.5 wt. % chemically bound bromine is introduced into a extruder-reactor comprising various operating zones such as:

(A) Feed Zone in which the uncrosslinked halogenated copolymer is introduced into the extruder-reactor in convenient form. This form includes, for example, particles and/or pellets. A solvent or diluent may also be introduced into the feed zone. The feed zone is designed to form the polymer feed into a cohesive mass and convey or pump the mass past a restrictive dam which may follow the feed zone and distinguishes it from the reaction zone which follows.

This operation is generally conducted at low shear and temperatures consistent with the desired result and at a pressure sufficient to convey the mass, typically up to about 600 psig, preferably up to about 400 psig, most preferably up to about 200 psig. Lower pressures are preferred in order to avoid overheating the polymer. This can be achieved, e.g., by utilizing an extruder screw with relatively with deep flights and by keeping the length of the feed zone, i.e., the feed zone screw length, as short as possible commensurate with desired production rates. For example, polymer is introduced at a temperature ranging from room temperature to about 200° C. and exits from the feed zone at about 60° to 200° C.

A restrictive dam may be used to separate the feed zone from the reaction zone which follows it. This dam is not restrictive enough, however, to cause excessive overheating of the polymer. A restrictive dam can be, for example, a reverse flighted screw section, a filled screw section, a shallow flighted screw section, an unflighted screw section, combinations thereof, or other means known in the art. If an unflighted screw section is employed, it can have a larger diameter than the root diameter upstream of it, for example, 5 to 25 percent larger, but not greater than the screw flight diameter. The restrictive dam length should be about 0.5 to about 23 screw diameters, preferably about 1 to about 2 screw diameters, more preferably about 0.5 to about 1 screw diameters in length. If a reverse flighted screw section is in employed, it can be single or multi-flighted, preferably multi-flighted.

It should be noted that where the restrictive dam configuration employed is more than a mere separation boundary or region between zones, for example, more than merely an unflighted screw section, the restrictive dam can be considered to be part of the reaction zone itself, for example, when a single or multi-flighted reverse flighted screw section is employed. Under such circumstances, the restrictive dam in this region of the extruder-reactor can be a part of or comprise a reaction zone. When the reaction zone is operated under vacuum in a partially filled mode, the restrictiveness of the dam between the feed and reactions zones can be reduced so as to permit some gas (e.g., air) to flow into the reaction zone from the feed zone.

In addition to the copolymer which is introduced into the feed zone, an optional diluent may also be added. A diluent can function to reduce the viscosity of the copolymer to a level commensurate which subsequent good mixing without the necessity for excessive heat and risk of molecular weight breakdown and undesirable side reactions; it can also function to reduce the temperature of the polymer. The diluent may be volatile saturated higher hydrocarbons, chlorohydrocarbons or chlorocarbon such as pentane, hexane, methylene chloride, chloroform or carbon tetrachloride. It may also be a non-hydrocarbon readily removable from the system downstream, but able to perform the function of temporarily reducing the apparent viscosity of the copolymer in the reaction zone. Materials added with the rubber, including diluents and/or curatives can be facilitated in their dispersion in the rubber by including a conveying zone or section preceeding the reaction zone.

(B) Reaction Zone is the zone in which the halogenated uncrosslinked polymer is heated at a temperature ranging from about 100° to about 260° C., preferably from about 170° to about 210° C., for a time sufficient to produce the desired partially crosslinked polymer of the present invention. The residence time in the reaction zone will generally range from above 0 to about 3 minutes, preferably from about 1 to about 2 minutes.

A curative agent, such as, for example, zinc oxide and zinc dibutyldithiocarbamate is also present in the reaction zone. The curative agent may be introduced into the reaction zone by various means. Thus, the curative agent may be pre-dispersed at the desired concentration in the uncrosslinked polymer at the desired concentration or it can be introduced as a separate stream into the feed zone and or into the reaction zone.

Also important for achieving efficient reaction of the copolymer is the incorporation in the reaction zone of means to produce the level of copolymer mixing and surface disruption preferred for the practice of this invention. This can be achieved, for example, by utilizing reverse flights on the reaction zone portion of the extruder screw, pins, shallow flights, etc. Other means include operation of the screw at a rotation rate of about 50 to 600 RPM, preferably about 70 to about 400 RPM, most preferably about 70 to about 200 RPM and by incorporation of a downstream restrictive dam of the type described above, to separate the reaction zone from the zone which follows it.

(C) Sweep Zone - preferably the extruder-reactor comprises a sweep zone in which entrained air and any volatile reaction products are swept out of the extruder. Suitable means to effect removal of these materials is the injection of an inert gas into the extruder. Vent means are provided in this zone to permit inert gas and disengaged materials to be swept out and removed from the system. In a particularly preferred embodiment, the screw configuration in the region of the vent comprises a deep single flighted screw with little or no mixing occurring in the vicinity of the vent in order to avoid restricting the exiting flow of inert gas and disengaged materials. If desired, stabilizers and other additives may be added to the copolymer in this sweep zone. Multiple injection sites can be used as well as a supplementary injection zone.

(D) Exit Zone - Preferably the extruder-reactor comprises a final exit zone in which the temperature of the partially crosslinked polymer product is adjusted for delivery at a temperature, for example, below about 200° C., more preferably below about 150° C. and most preferably below about 100° C. as a contribution to the stability of the copolymer. Also in the exit zone, stabilizers may be added to the polymer product.

The partially crosslinked unsaturated polymer which is produced in the extruder-reactor may be recovered as such or further processed to produce a desired shape, such as bales, pellets, etc.

The following examples are presented to illustrate the invention. Unless otherwise indicated, all parts and percentages are by weight.

EXAMPLE 1

The following uncrosslinked halogenated butyl rubbers were used as initial polymers for the preparation of crosslinked polymers of the present invention:

Polymer A was a copolymer of isobutylene and isoprene having about 0.8 to 1.0 mole percent unsaturation and 0.28 wt. % chemically bound chlorine, a Mooney viscosity (1+8) at 125° C. of 57 as measured in accordance with test ASTM D-1646. Polymer A also contained 0.98 wt. % calcium stearate which was used in its preparation.

Polymers B and C were uncrosslinked copolymers of isobutylene and isoprene having 0.9 mole percent unsaturation, a Mooney viscosity at 125° C. of 57-58. Polymers B and C had different chlorine levels. Polymer B contained 0.23 wt. % chemically bound chlorine. Polymer C contained 0.18 wt. % chlorine.

Four different curative packages were incorporated into the low halogenated uncrosslinked Polymers A, B, and C. The amounts and formulation of the curative packages are shown in Table 1. The proportions given in Table 1 are parts by weight based on 100 parts by weight of the uncrosslinked low halogenation initial polymers.

TABLE 1

| | Curative packages | | | |
|---|---|---|---|---|
| | I | II | III | IV |
| ZDEDC[1] | 1.5 | 1.5 | — | — |
| ZDBDC[2] | — | — | 2 | 2 |
| ZnO | 3 | 3 | 0.5 | — |
| Stearic Acid | 0.5 | 0.5 | — | — |
| MgO | 0.5 | — | — | — |

[1]ZDEDC - denotes zinc-N-diethyl dithiocarbamate
[2]ZDBDC - denotes zinc-N-dibutyl dithiocarbamate In each case, the blend was produced in a Banbury ® mixer by the steps of (1) placing 100 parts of low halogen content uncrosslinked polymer into the mixer at room temperature and heating with mixing to 150° C. over 6 minutes; (2) then adding the curative package to the mixer in the indicated amounts and mixing for an additional 7 minutes while controlling the mixer cooling and shear rate to maintain the blend at 150° C.; and (3) dumping the blend at 150° C. after a total time in the mixer of 13 minutes.

The curing process described above was monitored by reproducing the mixing on a Brabender® plastograph. The Brabender® results are shown in Table 2.

TABLE 2

| | Initial Torque (Nm) | Maximum Torque (Nm) | Scorch Time | Maximum Torque Time | Blend Color |
|---|---|---|---|---|---|
| Curative II | | | | | |
| Polymer C | 25 | 30 | 1' | 3'30" | white |
| Polymer B | 25 | 30 | 20" | 2' | white |
| Polymer A | 25 | 30 | immediate | 1' | white |
| Curative III | | | | | |
| Polymer C | 27 | 34 | 1' | 3'30" | white |
| Polymer B | 25 | 30 | 40" | 2'06" | white |
| Polymer A | 25 | 31 | immediate | 1'12" | white |
| Curative IV | | | | | |
| Polymer C | 28 | 32 | 2' | 5'30" | clear |
| Polymer B | 27 | 32 | 2' | 4'30" | clear |
| Polymer A | 25 | 31 | 1' | 4'18" | clear |

The crosslinked blends produced as described above were subjected to Mooney viscosity measurement at 150° C. (1+8 minutes) in accordance with ASTM test 1646. The results are shown in Table 3, in which values in parenthesis are for the blends produced in the Brabender mixer; other values are for blends produced in the Banbury mixer.

TABLE 3

| RUBBER | CURATIVE PACKAGE | | | |
|---|---|---|---|---|
| | I | II | III | IV |
| Polymer C | 59 | (64) | (63) | (59) |
| Polymer B | 73 | (76) 67 | (70) | (64) 72 |
| Polymer A | 84 | (80/72) 84/79 | (78/75) 77 | (78/75) 85/75 |

The crosslinked products prepared as described were found to have the following additional properties:

The crosslink densities were not measured on all samples shown in Table 3. On average, the following values were obtained:

| RUBBER | CROSSLINK DENSITY | (1)MOLECULAR WT. BETWEEN CROSSLINKS |
|---|---|---|
| Polymer C | $0.09 \times 10^{-4}$ moles/cm$^3$ | Mc = 51,000 |
| Polymer B | $0.12 \times 10^{-4}$ moles/cm$^3$ | Mc = 38,000 |
| Polymer A | $0.15 \times 10^{-4}$ moles/cm$^3$ | Mc = 32,000 |

(1)M$_c$ was calculated by the equation:

$$2 M_c = \frac{\text{Rubber density}}{\text{Crosslink density}} = \frac{0.92 \text{ (g/cm}^3\text{)}}{\text{crosslink density (moles/cm}^3\text{)}}$$

tion in products such as the fluctuations produced by methods of the prior art.

EXAMPLE 2

Use in sealing tape formulations

A sealing tape formulation was prepared by using a partially crosslinked butyl product produced in accordance with Example 1. The formulation was as follows:

| | Parts by weight |
|---|---|
| Partially crosslinked Butyl | 100 |
| CaCO$_3$ (Calofort U) | 235 |
| Silicate (Zeosil 35) | 60 |
| Escorez ® 1310$^{(1)}$ | 12 |
| Parapol ® 2225$^{(2)}$ | 150 |
| ZnO | 12 |
| Irganox ® 1076$^{(3)}$ | 1 |

Footnotes:
(1)Escorez 1310 is an aliphatic hydrocarbon tackyfing resin.
(2)Parapol 2225 is isobutene-butene low molecular weight copolymer.
(3)Irganox 1076 (Ciba-Geigy) is octadecyl-3-(3,5-ditert butyl-hydroxy hydrocinnamate; an antioxidant and thermal stabilizer.

The formulation was made in a Z-blade mixer under nitrogen blanket at 150° C., by the following sequence:

| Time | ADD |
|---|---|
| 0' | All partially crosslinked Butyl. |
| 10' | Escorez 1310 + Irganox 1076 |
| 15' | ¼ Fillers |
| 20' | ¼ Parapol 2225 |
| 25' | ¼ Fillers + ¼ Parapol 2225 |
| 30' | ¼ Fillers + ¼ Parapol 2225 |
| 35' | ¼ Parapol 2225 |
| 40' | ¼ Fillers |
| 90' | Dump |

The processability of the formulation was determined by measuring the stabilized torque of the mixture on a Brabender plastograph (after 15 minutes). The results are shown in Table 4. In this table, the formulation designated Polymer B-IV is a composition in which the butyl component is Polymer B containing 0.23 wt. % chlorine produced in accordance with Example 1, and cured with curative package IV.

TABLE 4

| Formulation | Mooney Viscosity (1 + 8) at 150° C. | Brabender Stabilized Torque (After 15') (Nm) |
|---|---|---|
| Polymer B | 72 | 8.2 |

The above described formulation was subjected to various tests to evaluate its performance as a sealant. The results are shown in Table 5. In addition, the tests for (a) cold flexibility at −40° C. and (b) sagging at 175° C. were performed.

TABLE 5

| Formulation | Compression Set (%) | Penetration (mm) | Yield Strength (N/10 cm) | Elongation % | BONDING TEST (Glass/Glass) Type of Bonding |
|---|---|---|---|---|---|
| Polymer B-IV | 75 | 5 | 84 | 280 | adhesive |

As can be seen from the data in the Tables, it is possible to manufacture elastomeric polymers having low levels of crosslinking, i.e., partially crosslinked polymers in a controlled manner to avoid significant fluctua- In general, good sealants require a good balance of properties which enable (1) good accommodation of joint movements (hence low compression set); (2) easy application (hence low softness/plasticity, e.g., penetration of about 5 mm); avoidance of adhesive failure. Normally, the resilience and plasticity of sealants are competing properties and good sealants are those which offer a good balance of low compression set and high penetration.

From Table 5, it is seen that the sealant according to the invention has properties which make it suitable for such uses. In addition, it has the advantage of uniformity and consistency.

The test methods used to generate the above results were as follows:

| Compression set | ASTM D395-85 (under constant deflection in air) |
|---|---|
| Penetration | ASTM C-0782 |
| Yield strength | ASTM C-0902 |
| Elongation | ASTM D-0638 |

EXAMPLE 3

An uncrosslinked chlorinated unsaturated butyl rubber comprising about 0.3 weight percent chlorine was introduced into a twin screw counter-rotating non-intermeshing extruder-reactor as follows:

1) Feed Zone: The uncrosslinked rubber entered the hopper opening and was conveyed forward into the closed barrel section A mixture of ZDBDC (Zinc Dibutyldithiocarbamate) and ZnO (Zinc Oxide), curing agent, in a 2:1 ratio was added into the feed opening at a rate of 2.5 parts by weight per hundred of rubber (phr) (1.67 ZDBDC and 0.83 ZnO) on rubber.

2) Conveying Zone: This section was comprised of mostly simple forward conveying flights with some interrupted flights present. Mixing in this zone was performed at a temperature of about 120° C. to 220° C.

3) Reaction Zone: A short reaction screw is comprised of shallow channel multiple flighted screw elements. This section was the maximum shear and mixing step in the process. At this point, the polymer temperature was at a temperature of 180°–220° C.

4) Stripping and Venting: This section was used for degassing any entrained air and stripping of any volatile degradation-causing products that may be present, such as hydrogen halides. Nitrogen was injected to sweep away any gaseous contaminants.

5) Exit Zone: This section was used for conveying the product out of the extruder-reactor.

Table 6 summarizes the process conditions and the results:

TABLE 6

| Polymer Feed: | Chlorobutyl rubber Mooney viscosity 39 (1 + 8 at 150° C.) Cl % 0.3 |
|---|---|
| Extruder-reactor Conditions | 50 K/H feed rate 95 RPM 1.25 K/H ZDBDC/ZnO (2:1) 200° C. MAX REACTION ZONE TEMPERATURE 1 K/H Cocurrent stripping nitrogen |

Footnotes:
K/H denotes kilograms per hour
RPM denotes revolutions per minute.

What is claimed is:

1. A process for preparing a partially crosslinked unsaturated copolymer of a $C_4$ to $C_7$ isomonoolefin and a $C_4$ to $C_{14}$ conjugated multiolefin, which comprises the step of contacting, at crosslinking conditions, an uncrosslinked, unsaturated halogen-containing copolymer of a $C_4$ to $C_7$ isomonoolefin and a $C_4$ to $C_{14}$ conjugated multiolefin comprising an unsaturated, non-halogen-containing moiety and an unsaturated, chemically bound allylic halogen-containing moiety, said halogen being selected from the group consisting of from about 0.05 to 0.4 weight percent chlorine, from about 0.05 to 0.5 weight percent bromine and mixtures thereof, in the presence of a curing agent which reacts essentially only with said allylic halogen and in the absence of a curing agent which reacts with said unsaturated, non-halogen-containing moiety.

2. The process of claim 1, wherein said chemically bound halogen is chlorine and wherein said chlorine is present in an amount ranging from about 0.05 to about 0.39 weight percent.

3. The process of claim 1, wherein said chemically bound halogen is bromine and wherein said bromine is present in an amount ranging from about 0.05 to about 0.49 weight percent.

4. The process of claim 1, wherein said crosslinked copolymer has an unsaturation ranging from about 0.05 to about 5.0 mole percent.

5. The process of claim 1, wherein said crosslinked copolymer has an unsaturation ranging from about 0.50 to about 2.5 mole percent.

6. The process of claim 1, wherein said crosslinked copolymer is a copolymer of isobutylene and isoprene.

7. The process of claim 1, wherein said curing agent which reacts essentially only with said allylic halogen is selected from the group consisting of metal oxides of Groups IIB and IVA of the Periodic Table of Elements; zinc salts of dithiocarbamic acid; dimercaptans; diols; thiourea-thiurams; alkyl phenol disulfides; amines, and mixtures thereof.

8. The process of claim 1, wherein said curing agent which reacts essentially only with said allylic halogen comprises zinc oxide.

9. The process of claim 1, wherein said curing agent which reacts essentially only with said allylic halogen is present in an amount sufficient to react with substantially all of said chemically bound halogen of said non-crosslinked copolymer.

10. The process of claim 8, wherein said zinc oxide is present in said contacting step in a molar ratio of zinc oxide to said chemically bound halogen of at least about 0.25:1.

11. The process of claim 8, wherein said zinc oxide is present in said contacting step in a molar ratio of zinc oxide to said chemically bound halogen of at least about 1:1.

12. The process of claim 1, wherein said process is conducted in the absence of phenolic resin and in the absence of elemental sulfur.

13. The process of claim 1, wherein said crosslinked unsaturated copolymer has a crosslink density ranging from about 0.05 to about $0.22 \times 10^{-4}$ moles per cubic centimeter.

14. The process of claim 1, wherein said crosslinking conditions include a temperature ranging from about 100° to about 260° C.

15. A process for preparing a partially crosslinked unsaturated copolymer of a $C_4$ to $C_7$ isomonoolefin and a $C_4$ to $C_{14}$ conjugated multiolefin, which comprises the steps of:
(a) contacting an uncrosslinked unsaturated halogen-containing copolymer of a $C_4$ to $C_7$ isomonoolefin and a $C_4$ to $C_{14}$ conjugated multiolefin comprising an unsaturated, non-halogen-containing moiety and an unsaturated, chemically bound allylic halogen-containing moiety, said halogen being selected from the group consisting of from about 0.05 to about 0.4 weight percent chlorine, and from about 0.05 to 0.5 weight percent bromine and mixtures thereof, in the presence of a curing agent which reacts essentially only with said allylic halogen and in the absence of a curing agent which reacts with said unsaturated, non-halogen-containing moiety, in a reaction zone of a continuous flow device; and
(b) recovering a partially crosslinked, unsaturated copolymer of a $C_4$ to $C_7$ isomonoolefin and a $C_4$ to $C_{14}$ conjugated multiolefin.

16. The process of claim 15, wherein said crosslinking conditions of step (a) include a temperature ranging from about 100° to about 260° C.

17. The process of claim 15, wherein said uncrosslinked copolymer is maintained in said reaction zone for a residence time ranging from above zero to about 3 minutes.

18. The process of claim 15, wherein said curing agent comprises a mixture of zinc oxide and zinc dibutyldithiocarbamate.

19. The partially crosslinked unsaturated copolymer prepared by the process of claim 1.

20. The partially crosslinked unsaturated copolymer prepared by the process of claim 2.

21. The partially crosslinked unsaturated copolymer prepared by the process of claim 3.

22. The partially crosslinked unsaturated copolymer prepared by the process of claim 4.

23. The partially crosslinked unsaturated copolymer prepared by the process of claim 5.

24. The partially crosslinked unsaturated copolymer prepared by the process of claim 6.

25. The partially crosslinked unsaturated copolymer prepared by the process of claim 7.

26. The partially crosslinked unsaturated copolymer prepared by the process of claim 8.

27. The partially crosslinked unsaturated copolymer prepared by the process of claim 9.

28. The partially crosslinked unsaturated copolymer prepared by the process of claim 10.

29. The partially crosslinked unsaturated copolymer prepared by the process of claim 11.

30. The partially crosslinked unsaturated copolymer prepared by the process of claim 12.

31. The partially crosslinked unsaturated copolymer prepared by the process of claim 13.

32. The partially crosslinked unsaturated copolymer prepared by the process of claim 14.

33. The partially crosslinked unsaturated copolymer prepared by the process of claim 15.

34. The partially crosslinked unsaturated copolymer prepared by the process of claim 16.

35. The partially crosslinked unsaturated copolymer prepared by the process of claim 17.

36. The partially crosslinked unsaturated copolymer prepared by the process of claim 18.

* * * * *